United States Patent Office 2,882,312
Patented Apr. 14, 1959

2,882,312

PRODUCTION OF ORGANOPHOSPHORUS COMPOUNDS

Jack Kwiatek, North Arlington, N.J., assignor to The M. W. Kellogg Company, Jersey City, N.J., a corporation of Delaware No Drawing. Application June 28, 1954
Serial No. 439,859

20 Claims. (Cl. 260—543)

This invention relates to a new and improved process for the production of organophosphorus compounds. In one aspect this invention relates to the production of organic phosphonyl halides and the corresponding organic phosphorus-containing acids and derivatives derived therefrom. In another aspect this invention relates to the production of organic phosphine oxides. In still another particular aspect this invention relates to the production of methane phosphonyl dichloride.

The organic phosphonyl halides and especially methane phosphonyl dichloride, as well as the organic phosphine oxides, are much in demand as intermediate chemical reactants for the production of more complex organic phosphorus compounds, such as the corresponding esters, free acids and amides by conventional methods, which are useful as fungicides, insecticides, pharmaceuticals, petroleum additives for improving lubricating oils and polymer additives. Prior to the present invention, relatively low molecular weight organic phosphonyl halides and phosphine oxides have been obtained by devious and round about methods involving numerous chemical and mechanical steps. Less involved methods for the production of organic phosphonyl halides, for example, are not applicable to the production of low molecular weight analogs in good yields. Methane phosphonyl dichloride is a particularly difficult compound to produce. For example, the reaction between methane, phosphorous trichloride and oxygen is a very poor reaction and produces methane phosphonyl dichloride in very low yield, although higher molecular weight alkanes, such as n-heptane react with phosphorus trichloride and oxygen to produce the corresponding alkane phosphonyl dichlorides in somewhat better yields.

It is therefore an object of the present invention to provide a new and improved process for producing organic phosphonyl halides and organic phosphine oxides.

Another object is to produce such organophosphorus compounds with the minimum formation of by-products and with the maximum utilization of reactants.

Still another object is to provide a novel direct method for the production of organic phosphonyl halides and organic phosphine oxides.

Still another object of this invention is to provide an effective and economical process by which such organophosphorus compounds may be prepared in high yield with good selectivity.

A further object is to provide a direct method for the production of methane phosphonyl dichloride in high yield with good selectivity.

Various other objects and advantages of the present invention will become apparent to those skilled in the art from the accompanying description and disclosure.

In accordance with this invention organophosphorus compounds of the general formula $R_nX_mP=O$ including organic phosphonyl dihalides, organic phosphonyl mono halides and organic phosphine oxides are produced by a process which comprises reacting under appropriate conditions a trivalent phosphorus halide and an alkoxy-containing alkylating agent selected from the group consisting of the organic ethers, esters, acetals, ketals and alkoxy halo phosphines in the presence of formaldehyde. The symbol "X" of the general formula for the organophosphorus compounds produced in accordance with this invention represent halogens (F, Cl, Br, and I) and the subscript "$m$" is the number of halogens from 0 to 2. The symbol "R" of the general formula is an organic radical and the subscript "$n$" is the number of organic radicals from 1 to 3. Where more than one organic radical is included in the product, or more than one halogen is included in the product, these organic radicals and halogens may be the same or different. Preferably, the organic radicals are unsubstituted alkyl or aralkyl, or halogen substituted alkyl radicals having not more than 12 carbon atoms.

By an alkylating agent is meant a chemical reagent which under appropriate conditions is capable of introducing an alkyl or aralkyl group into a chemical compound. The alkylating agents described herein are those containing at least 1 alkoxy group (RO—) which is the source of at least one of the organic radicals found in the final product. The organic ethers, esters, acetals, ketals and alkoxy halo phosphines used as alkylating agents in accordance with this invention are represented by the general formula RO—Y, wherein R is an organic radical and has the same definition as the organic (R) radical of the general formula $R_nX_mP=O$ given for the products of this invention; and Y is selected from the group consisting of an organic group and a dihalo phosphorus group ($-PX_2$).

The preferred alkylating agents to be reacted with formaldehyde and trivalent phosphorus halide have the formula R—O—R′ in which R is an alkyl or aralkyl radical, more preferably an alicyclic or an acyclic alkyl radical, having not more than twelve carbon atoms and R′ is an organic radical, preferably containing a continuous carbon skeleton of not more than twelve carbon atoms, i.e., all carbon attached together,

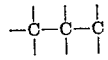

and R′ may be the same as or different from R. In case R or R′ are halogen substituted hydrocarbon radicals, the halogens are any of the group fluorine, chlorine, iodine, or bromine; however, chlorine and bromine are preferred. Preferably R′ is an alkyl or aralkyl or halogen substituted alkyl radical.

The preferred organic ethers are selected from the group consisting of the acyclic and alicyclic alkyl ethers including the substituted acyclic alkyl ethers selected from the group consisting of the halo, nitro, cyano and aryl substituted ethers having not more than 24, preferably 14, carbon atoms per molecule. Examples of ethers are the simple symmetrical ethers, such as dimethyl ether; diethyl ether; di-n-octyl ether; dicyclohexyl ether; dibenzyl ether; beta, beta′-dichloro diethyl ether; and beta, beta′-oxy diproprionitrile. The simple unsymmetrical ethers are also useful but, with the exception of the alpha halo substituted unsymmetrical ethers, such ethers lead to the formation of mixed products corresponding to the different alkyl or cycloalkyl radicals of the ether. Of such unsymmetrical ethers examples are: methyl ethyl ether, methyl n-butyl ether, ethyl n-propyl ether, methyl t-butyl ether, cyclohexyl methyl ether, 2-nitropropyl methyl ether and methyl benzyl ether. The mono-alpha halogenated ethers, such as those with the general formula

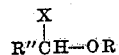

in which R″ is hydrogen or an alkyl radical and X is a halogen (F, Cl, Br, and I) have been found to give high yields of organic phosphonyl halides

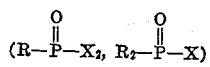

and organic phosphine oxides ($R_3P=O$) when employed according to this invention. Examples of a few such halogenated ethers are: chloromethyl methyl ether, bromomethyl ethyl ether, alpha-chloroethyl propyl ether and bromomethyl isoamyl ether. Instead of using simple ethers containing only one ether linkage, poly ethers, such as polyoxyethylene and polyoxypropylene alcohols may be employed in this invention.

Examples of the esters which are used as alkylating agents include the alkyl and aralkyl, either acyclic or alicyclic, esters including the mono esters, the poly esters and the ortho esters, preferably having not more than 24, usually 12, carbon atoms per molecule. Preferred mono esters are: methyl formate, methyl acetate, butyl acetate, benzyl acetate, and methyl proprionate. Suitable ortho esters include trimethyl ortho formate, trimethyl ortho acetate, dimethyl cyclopentyl ortho acetate and trimethyl ortho benzoate. Examples of polyesters are: dimethyl oxalate, dimethyl phthalate and dimethyl adipate. Other esters include the polyesters of inorganic acids, such as dimethyl carbonate, dimethyl sulfate, diethyl sulfate, trimethyl borate, tributyl borate and triethyl phosphate.

Suitable acetals include the dialkyl acetals derived from an aliphatic alcohol and aldehyde and having not more than 12 carbon atoms per molecule, such as dimethyl formal, diethyl formal, dimethyl acetal and diethyl benzal.

Examples of ketals for use in this invention are the dialkyl ketals derived from an aliphatic alcohol and ketone having not more than 12 carbon atoms per molecule, such as dimethyl ketal of acetone and cyclohexanone.

The alkoxy phosphorus halides ($ROPX_2$) which also are used as alkylating agents in accordance with this invention contain organic radicals which generally are selected from the same classes as the organic radical (R) of the alkylating agent previously discussed, and halogen atoms which may be any of the halogens (Br, Cl, I, F) and may be the same or different. The preferable type of alkoxy halo phosphine is the unsubstituted alkoxy phosphine dichloride, such as methoxy phosphorus dichloride and ethoxy phosphorus dichloride.

In general the preferable type of alkylating agent is that of the R—O—R' type. This is especially true when preparing a phosphonyl halide or a phosphine oxide in which the organic radical is substituted with any of the previously mentioned substituents inasmuch as the substituted R—O—R' compounds are more readily available than the corresponding substituted alkoxy halo phosphine. However, when producing an unsubstituted alkyl phosphine oxide, the R—O—R' and RO—$PX_2$ types of alkylating agents are equally suitable. Mixtures of two or more different alkylating agents can be reacted with the trivalent phosphorus halide and formaldehyde without departing from the scope of this invention.

The presence of formaldehyde in the reaction mixture containing the trivalent phosphorus halide and alkylating agent leads to enhanced yields of product especially when the alkylating agent is a simple mono ether or an alkoxy halo phosphine. It is known that formaldehyde is seldom encountered or used in its pure monomeric form inasmuch as it polymerizes very readily to cyclic polyoxy methylene, such as trioxane, and to acyclic polyoxy methylenes, such as paraformaldehyde. As a matter of convenience, therefore, the formaldehyde is usually added to the reaction zone in the form of one of the above polymers. Inasmuch as these polymers will break down into the formaldehyde unit (HCHO) during the course of the reaction conducted in accordance with this invention, and are thus equivalent to monomeric formaldehyde, this reactant is referred to herein as formaldehyde as such.

Either inorganic or organic trivalent phosphorus halides are used in accordance with the present invention. Typical examples of inorganic trivalent phosphorus halides are as follows: phosphorus trifluoride, phosphorus trichloride, phosphorus tribromide and phosphorus triiodide; mixed phosphorus halides, such as difluorophosphorus chloride, difluorophosphorus iodide, dichlorophosphorus fluoride, chlorobromophosphorus fluoride and dichlorophosphorus bromide; and diphosphorus tetraiodide. The preferred organic trivalent phosphorus halides which are useful in accordance with this invention are the hydrocarbon phosphorus halides having only a continuous carbon skeleton of not more than fifteen carbon atoms linked directly to the phosphorus atom, such as the acyclic and alicyclic alkyl phosphorus halides, either substituted or unsubstituted, selected from the same classes as discussed with regard to the alkylating agents; and the aromatic phosphorus halides, either substituted or unsubstituted. The organic radical of the phosphorus halide may be the same as or different from the organic radical of the alkylating agent. Typical examples of organic phosphorus halides are methyl phosphorus dichloride, ethyl phosphorus difluoride, isopropyl phosphorus dichloride, benzyl phosphorus dichloride, phenyl phosphorus diiodide, diphenyl phosphorus chloride, diphenyl phosphorus bromide, 4-nitro phenyl phosphorus dibromide, 4-bromophenyl phosphorus dichloride, di(4-nitrophenyl) phosphorus chloride, methyl ethyl phosphorus chloride, methyl ethyl phosphorus bromide, diethyl phosphorus bromide, dibenzyl phosphorus chloride, dipropyl phosphorus chloride, cyclohexyl phosphorus dichloride, cyclopentyl phosphorus dibromide, beta-chlorooctyl phosphorus dichloride and cyclooctyl bromo phosphorus chloride. The halogen of the trivalent phosphorus halide may be any of the halogens, preferably the gaseous halogens, such as chlorine, without departing from the scope of the invention.

The particular trivalent phosphorus halide employed depends upon the ultimate product desired. When producing an organic phosphonyl dihalide

an inorganic phosphorus trihalide ($PX_3$) is employed. When producing an organic phosphonyl monohalide, such as methyl phenyl phosphonyl chloride, an organic phosphorus dihalide, such as phenyl phosphorus dichloride, is employed. Further when producing a phosphine oxide in which the three organic radicals may or may not be the same, an organic phosphorus monohalide of the type $R_2PX$ is used. The R's of the product may not be the same, and are the same as the R radical of the alkylating reactant or the organic phosphorus halide.

The aliphatic and aromatic phosphorus halides are prepared by reacting a phosphorus trihalide, such as the trichloride, with a dialkyl, dicycloalkyl, or diaryl mercury derivative at a temperature of 180° C. to 230° C. The dihalides are first produced and by continuing the heating for a further length of time the monohalide may be produced and recovered. The aromatic phosphorus halides may also be produced by reacting an aromatic hydrocarbon with a phosphorus trihalide in the presence of a Friedel-Crafts catalyst, such as aluminum chloride.

The process described herein is carried out with or without the presence of a catalyst, but the use of a catalyst is preferred because in most instances a high yield is obtained. Suitable catalysts comprise those of the metal iodide type, such as sodium iodide, potassium iodide, aluminum iodide, zinc iodide, cobalt iodide, nickel iodide and an admixture of nickel iodide and nickel tetrakistrichlorophosphine; both inorganic phosphorus iodide and organic phosphonium iodides, such as phosphorus diiodide and tetramethyl phosphonium iodide; free iodine; and Friedel-Crafts type catalysts, such as ferric chloride, aluminum chloride, aluminum bromide, zinc chloride and boron trifluoride; and alkyl iodides such as methyl iodide and ethyl iodide. Small amounts of phosphorus triiodide although classed as a reactant may act as catalyst when it or an additional trivalent phosphorus halide is used as the principal trivalent phosphorus halide. The catalyst is generally employed in an amount between about 0.01 moles and about 1.5 moles per mole of trivalent phosphorus halide. Preferably, between about 0.02 mole and about 0.5 mole of catalyst is employed per mole of trivalent phosphorus halide.

Generally the mole ratios of the alkylating agent and the formaldehyde (as HCHO) each with respect to the trivalent phosphorus halide reactant will range from about 0.05 to about 2.0; the preferable range being between about 0.1 and about 1.0. It is preferable to use an excess of trivalent phosphorus halide in order to prevent the introduction of more than one organic group into the phosphorus halide reactant and thereby avoiding the formation of excessive amounts of by-products. For example, when producing ethane phosphonyl dichloride by the reaction of ethyl chloride, phosphorus trichloride and formaldehyde, an excess of phosphorus trichloride will prevent the formation of diethyl phosphorus chloride. When it is desired to produce such phosphonyl mono halides as the main reaction product, a reaction similar to that given in equation 3 below is used in which an organic phosphorus dihalide, an alkylating agent and formaldehyde are employed.

As stated previously organic phosphonyl halides and organic phosphine oxides are produced by the reaction between formaldehyde, an alkoxy-containing alkylating agent and a trivalent phosphorus halide as shown by the following illustrative type reaction equations wherein the solid residues formed during the course of the reactions have been found to contain varying amounts of combined phosphorus, halogen and oxygen and carbon, and accounts for the excess oxygen, methylene groups and halogen not in the main product.

(1) $HCHO + PX_3 + R-O-R' \rightarrow RP(O)X_2 + $ solid residue
(2) $HCHO + PX_3 + RO-PX_2 \rightarrow RP(O)X_2 + $ solid residue
(3) $HCHO + RPX_2 + R-OR' \rightarrow R_2P(O)X + $ solid residue
(4) $HCHO + RRPX + R-OR' \rightarrow RRRP(O) + $ solid residue The groups in the chemical formulae shown above represent organic radicals as previously discussed and may be the same or different, and X represents a halogen atom (Cl, F, Br and I).

The process of this invention may be conducted in batchwise or continuous systems, or as a stepwise reaction. When a catalyst is employed the reaction of the process described herein may be conducted as a multistage reaction, but preferably as a two-stage reaction. The first stage is the reaction of formaldehyde, an alkylating agent and a trivalent phosphorus halide in the presence of a suitable catalyst. The second and subsequent stages are the reaction of the total crude product obtained in the first step with additional amounts of the same reactants with or without the addition of more catalyst. In so conducting the reaction in this stepwise manner improved yields of phosphonyl halides and phosphine oxides are obtained by using smaller amounts of catalyst as compared to the amount of catalyst needed when the reaction is conducted as a one-step reaction.

The process of the present invention is operative at a temperature between about room temperature (20° C.) and the decomposition temperature of the reactants. Generally the temperature of the reaction will be below about 350° C. The reaction is effected at elevated temperatures by introducing the individual reactants, either separately or together, into a reaction zone, such as a steel bomb, and carrying out the reaction under autogenous conditions of pressure as a matter of convenience, however imposed pressure up to 1000 pounds per square inch gage can be employed without departing from the scope of this invention. The preferred temperature range is between about 150° C. and about 300° C. The time of reaction may vary over relatively wide limits, such as between about 10 minutes and about 20 hours, but the preferable contact time, or residence, has been found to be between about 1 and about 15 hours.

When a metal iodide or free iodine is used as a catalyst, any free iodine which may be present upon completion of the reaction is conveniently separated by treating the crude product with mercury, followed by removal of the mercury salts. The products of the reaction, including both organic phosphonyl halides and the organic phosphine oxides, are further purified and recovered by conventional methods, such as distillation of liquid products or crystallization of solid products, depending upon the physical nature of the products. Liquid products are separated as almost one hundred percent pure by efficient fractional distillation. The phosphonyl halides are isolated as such and used as an insecticide or are hydrolyzed to the corresponding phosphonic acids which are then converted to various ester derivatives, or the phosphonyl halides are converted directly to a desired type ester by conventional methods known to those skilled in the art. These derivatives have many known uses to those skilled in the art as previously discussed, such as fungicides, insecticides, etc. The products are identified by the usual methods, such as determination of boiling point and other such physical properties, determination of infrared spectra, percent composition analysis, mass spectrometer analysis, etc. The phosphine oxides of this invention are useful as petroleum additives for lubricants to increase their stability at high temperatures.

The reaction can be effected in the presence of liquid diluents or solvents, such as benzene, nitrobenzene, toluene and hexane, in which the reactants are dissolved or dispersed by mechanical agitation or by conventional emulsifying agents. The diluent is present usually in an amount of between about 75 and about 25 volume percent of the total mixture.

It is to be understood that the choice of temperature of reaction, contact time, molar quantities of reactants and catalyst to be preferred in any instance will depend upon the starting materials employed and the result desired, and that the procedure employed for the isolation and purification of desired products will be dependent upon the physical nature of the products.

The following examples are offered as a better understanding of the present invention, but the examples are not to be considered as unnecessarily limiting the present invention. Although the following examples describe the preparation of methane phosphonyl dichloride other organo-phosphorus compounds may be prepared similarly by the process of this invention in accordance with the specific technique and recation conditions of the examples by appropriate substitution of starting materials, a few illustrative examples of which are: ethane phosphonyl dibromide, 2-chloroethane phosphonyl dibromide, cyclohexane phosphonyl dichloride, ethyl phenyl phosphonyl chloride, dibutyl phosphonyl chloride, trimethyl phosphine oxide, and ethyl propyl phenyl phosphine oxide.

*Example 1*

A 200 ml. steel bomb was charged with 106 ml. (1.2 moles) of phosphorus trichloride, 18.4 g. (0.37 mole) of dimethyl ether and 63.8 grams (0.2 mole) of zinc iodide. The bomb was then closed, placed in a reciprocating shaker and heated to 250° C. for a period of 7 hours. After cooling the bomb was vented to atmospheric pressure. The total crude product in the bomb was transferred to a distilling flask and distilled at atmospheric pressure. Two liquid fractions were obtained having the following boiling point ranges: 65°–90° C. and 90°–220° C. The first fraction was found to consist chiefly of unreacted starting materials. The second fraction was diluted with purified chloroform, shaken with mercury, filtered to remove the mercury salts, and distilled at atmospheric pressure. A main fraction was collected having a boiling point range of 159°–164° C. and containing a 5 percent yield of methane phosphonyl dichloride.

*Example 2*

A 200 ml. steel bomb was charged with 106 ml. (1.2 moles) of phosphorus trichloride, 18.4 g. (0.34 mole) of dimethyl ether, 12.01 g. (0.13 mole) of trioxane $(HCHO)_3$ and 63.89 grams (0.2 mole) of zinc iodide. The bomb was then closed, placed in a reciprocating shaker and heated to 250° C. for a period of 7 hours. After cooling the bomb was vented to atmospheric pressure. The total crude product in the bomb was transferred to a distilling flask and distilled at atmospheric pressure. Two liquid fractions were obtained having the following boiling point ranges: 70°–90° C. and 90°–223° C. The first fraction was found to consist chiefly of unreacted starting materials. The second fraction was diluted with purified chloroform, shaken with mercury, filtered to remove the mercury salts, and distilled at atmospheric pressure. The main fraction had a boiling point range of 159°–165° C. and contained a substantially higher amount of methane phosphonyl dichloride (58% yield) than the corresponding fraction of Example 1, thus pointing up the advantage of the use of formaldehyde in the reaction mixture.

*Example 3*

A 200 ml. steel bomb was charged with 38 ml. (0.4 mole) of methoxy phosphorus dichloride, 70 ml. (0.8 mole) of phosphorus trichloride and 25.1 gs. (0.08 mole) of nickel iodide. The bomb was then closed, placed in a reciprocating shaker and heated to 250° C. for a period of 7 hours. After cooling the bomb was vented to atmospheric pressure. The total crude product in the bomb was transferred to a distilling flask and distilled at atmospheric pressure. Three liquid fractions were obtained having the following boiling point ranges: 70°–85° C., 85°–135° C., and 135°–205° C. The first two fractions were found to contain unreacted starting materials. The third fraction (135°–205° C.) was freed of iodine by shaking with mercury and chloroform followed by removal of the mercury salts by filtration. After removal of the chloroform this higher boiling fraction was purified further by distillation at atmospheric pressure to yield a liquid fraction boiling between 150° and 185° C. and containing only a 4% yield of methane phosphonyl dichloride.

*Example 4*

When the run of Example 3 is carried out in the presence of 12.01 grams (0.4 mole) of formaldehyde a better yield and purer fraction of methane phosphonyl dichloride is obtained. The purified fraction containing at least a 12% yield of methane phosphonyl dichloride had a boiling point of 160°–165° C.

*Example 5*

A 200 ml. steel bomb was charged with 106 ml. (1.2 moles) of phosphorus trichloride, 24 grams (0.4 mole) of methyl formate, 12 grams (0.13 mole) of trioxane, and 62.5 grams (0.2 mole) of nickel iodide. The bomb was then closed, placed in a reciprocating shaker and heated to 250° C. for a period of 7 hours. After cooling the bomb was vented to atmospheric pressure. The total crude product in the bomb was transferred to a distilling flask and distilled at atmospheric pressure. Two liquid fractions were obtained having the following boiling point ranges: 55°–90° C. and 90°–211° C. The first fraction was found to consist chiefly of unreacted starting materials. The second fraction was diluted with purified chloroform, shaken with mercury, filtered to remove the mercury salts, and distilled at atmospheric pressure. The main fraction obtained contained a substantial yield (at least 42%) of methane phosphonyl dichloride and had a boiling point of 150°–166° C.

*Example 6*

A 200 ml. steel bomb was charged with 79 ml. (0.9 mole) of phosphorus trichloride, 22.83 grams (0.3 mole) of dimethyl formal, 9.01 grams (0.13 mole) of trioxane, and 46.9 grams (0.15 mole) of nickel iodide. The bomb was then closed, placed in a reciprocating shaker and heated to 250° C. for a period of 7 hours. After cooling the bomb was vented to atmospheric pressure. The total crude product in the bomb was transferred to a distilling flask and distilled at atmospheric pressure. Two liquid fractions were obtained having the following boiling point ranges: 60°–90° C. and 90°–213° C. These fractions were combined, diluted with purified chloroform, shaken with mercury, filtered to remove the mercury salts, and distilled at atmospheric pressure. The main fraction boiled at 150° C. to 164° C. and contained at least a 56 percent yield of methane phosphonyl dichloride.

In all of the above examples the yield of product formed was calculated on the basis of the amount of alkylating agent added to the reaction zone.

The present invention relates to the production of organic phosphorus compounds by the use of formaldehyde as an additional reactant. Various modifications of the technique of reaction and optimum reaction conditions may become apparent to those skilled in the art without departing from the scope of this invention. The theory and reaction mechanism are offered as a means for better understanding the invention and should not be construed as limiting the invention.

Having described my invention, I claim:

1. A process which comprises interacting a phosphorus trihalide and an alkoxy-containing organic compound having the formula RO—Y wherein R is an alkyl radical and Y is a radical selected from the group consisting of an unsubstituted alkyl radical, a haloalkyl radical, a —CH$_2$—O-alkyl radical, a

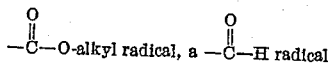

and a dihalophosphorus radical, each of said alkyl radicals having not more than 12 carbon atoms, in the presence of a compound selected from the group consisting of formaldehyde and a compound which yields formaldehyde when heated, at a temperature between about 20° C. and about 350° C. to produce an organic phosphorus halide.

2. The process of claim 1 in which the said compound which yields formaldehyde when heated is a cyclic polyoxy methylene.

3. The process of claim 1 in which the said compound which yields formaldehyde when heated is trioxane.

4. The process of claim 1 in which the said compound which yields formaldehyde when heated is an acyclic polyoxy methylene.

5. The process of claim 1 in which the said compound which yields formaldehyde when heated is paraformaldehyde.

6. The process of claim 1 in which said alkoxy-containing organic compound having the formula RO—Y is an organic ether.

7. The process of claim 1 in which said alkoxy-containing organic compound having the formula RO—Y is an ester.

8. The process of claim 1 in which said alkoxy-containing organic compound having the formula RO—Y is an acetal.

9. The process of claim 1 in which said alkoxy-containing organic compound having the formula RO—Y is an alkoxy phosphorus halide.

10. A process which comprises interacting a phosphorus trihalide and a methoxy-containing organic compound having the formula CH$_3$O—Y wherein Y is a radical selected from the group consisting of an unsubstituted alkyl radical, a haloalkyl radical, a —CH₂—O-alkyl radical, a $$-\overset{O}{\underset{\|}{C}}-O\text{-alkyl radical, a} -\overset{O}{\underset{\|}{C}}-H \text{ radical}$$

and a dihalophosphorus radical, each of said alkyl radicals having not more than 12 carbon atoms, in the presence of a compound selected from the group consisting of formaldehyde and a compound which yields formaldehyde when heated, at a temperature between about 20° C. and about 350° C. to produce a methane phosphonyl halide.

11. A process for the production of methane phosphonyl dichloride which comprises reacting trioxane, phosphorus trichloride, and dimethyl ether at a temperature between about 150° C. and about 300° C. for a residence time between about 1 and about 15 hours to produce methane phosphonyl dichloride, and recovering the methane phosphonyl dichloride as a product of the process.

12. The process of claim 11 in which the reaction is effected in the presence of zinc iodide as a catalyst.

13. A process for the production of methane phosphonyl dichloride which comprises reacting formaldehyde, methoxy phosphorus dichloride, and phosphorus trichloride at a temperature between about 150° C. and about 300° C. for a residence time between about 1 and about 15 hours to produce methane phosphonyl dichloride, and recovering the methane phosphonyl dichloride as a product of the process.

14. The process of claim 13 in which the reaction is effected in the presence of nickel iodide as a catalyst.

15. A process for the production of methane phosphonyl dichloride which comprises reacting trioxane, phosphorus trichloride and methyl formate at a temperature between about 150° C. and about 300° C. for a residence time between about 1 and about 15 hours to produce methane phosphonyl dichloride, and recovering the methane phosphonyl dichloride as a product of the process.

16. The process of claim 15 in which the reaction is effected in the presence of nickel iodide as a catalyst.

17. A process for the production of methane phosphonyl dichloride which comprises reacting trioxane, phosphorus trichloride and dimethyl formal at a temperature between about 150° C. and about 300° C. for a residence time between about 1 and about 15 hours to produce methane phosphonyl dichloride, and recovering the methane phosphonyl dichloride as a product of the process.

18. The process of claim 17 in which the reaction is effected in the presence of nickel iodide as a catalyst.

19. A process for the production of methane phosphonyl dichloride which comprises reacting phosphorus trichloride with methoxy phosphorus dichloride in the presence of a compound selected from the group consisting of formaldehyde and a compound which yields formaldehyde when heated, at a temperature between about 20° C. and about 350° C. for a residence time from about 10 minutes to about 20 hours to produce methane phosphonyl dichloride.

20. The process of claim 19 in which the reaction is effected in the presence of nickel iodide as a catalyst.

References Cited in the file of this patent

UNITED STATES PATENTS

| | | |
|---|---|---|
| 2,252,675 | Prutton et al. | Aug. 12, 1941 |
| 2,500,022 | Brown | Mar. 7, 1950 |
| 2,683,168 | Jensen et al. | July 6, 1954 |

UNITED STATES PATENT OFFICE
CERTIFICATE OF CORRECTION

Patent No. 2,882,312

April 14, 1959

Jack Kwiatek

It is hereby certified that error appears in the printed specification of the above numbered patent requiring correction and that the said Letters Patent should read as corrected below.

Column 4, line 54, for "may not" read — may or may not —; line 75, for "iodide" read — iodides —; column 6, line 57, for "recation" read — reaction —.

Signed and sealed this 13th day of October 1959.

(SEAL)
Attest:

KARL H. AXLINE
Attesting Officer

ROBERT C. WATSON
Commissioner of Patents